Aug. 1, 1939.  R. L. ANDERSON ET AL  2,167,967
CORN HUSKER
Filed March 22, 1937   2 Sheets-Sheet 1
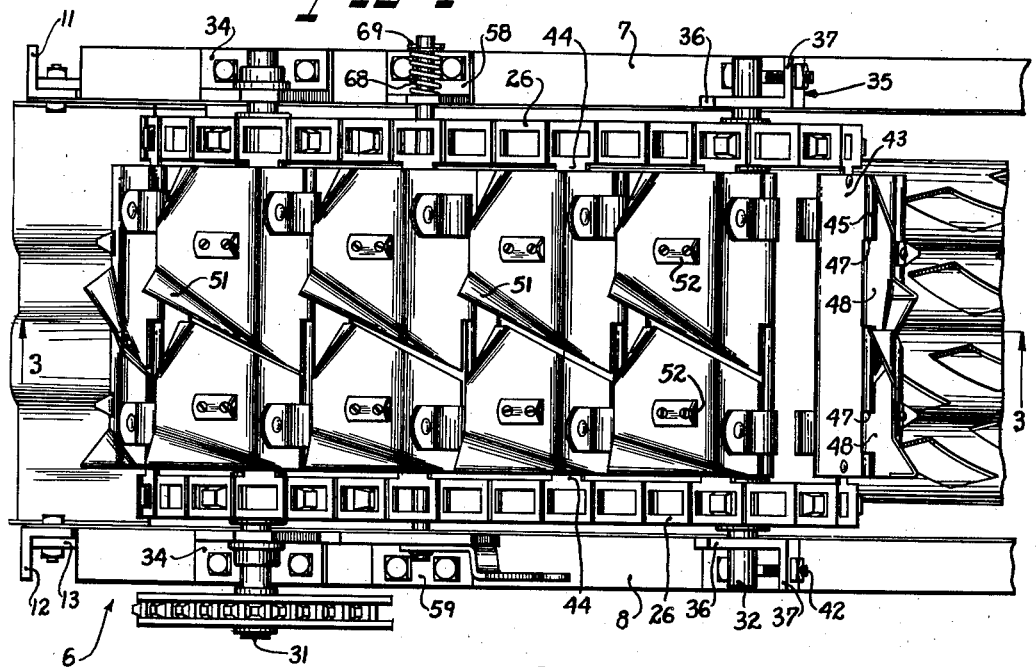
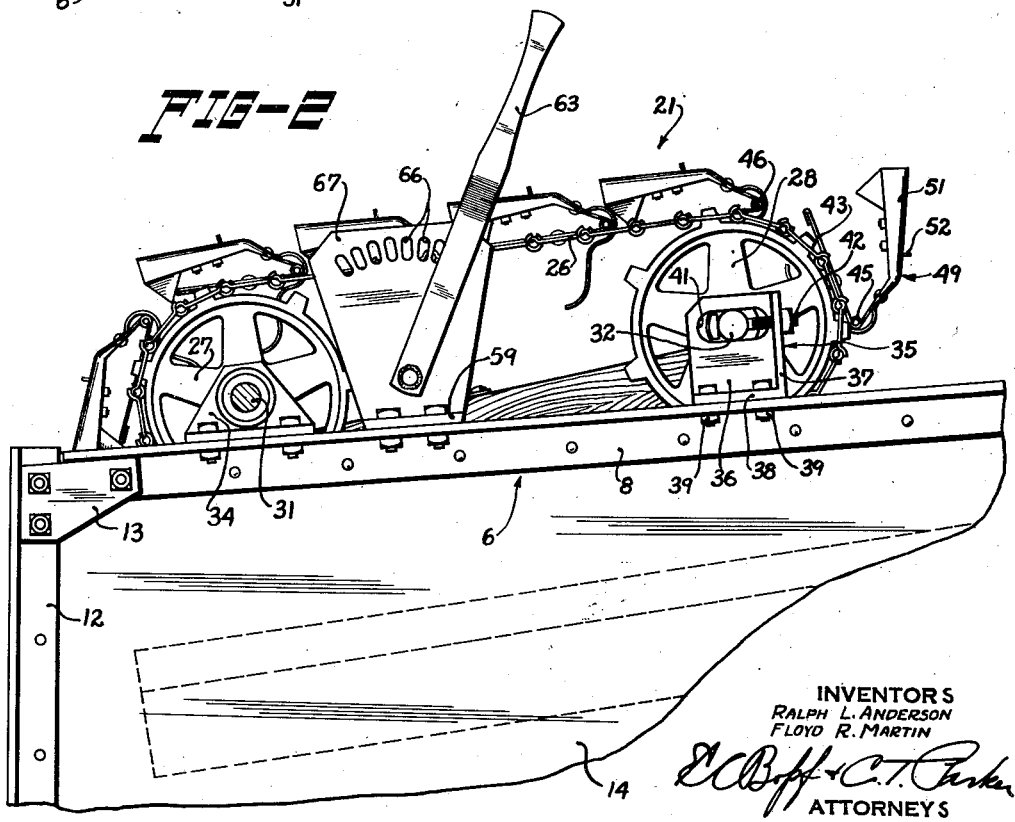
INVENTORS
RALPH L. ANDERSON
FLOYD R. MARTIN
ATTORNEYS Aug. 1, 1939.  R. L. ANDERSON ET AL  2,167,967
CORN HUSKER
Filed March 22, 1937   2 Sheets-Sheet 2
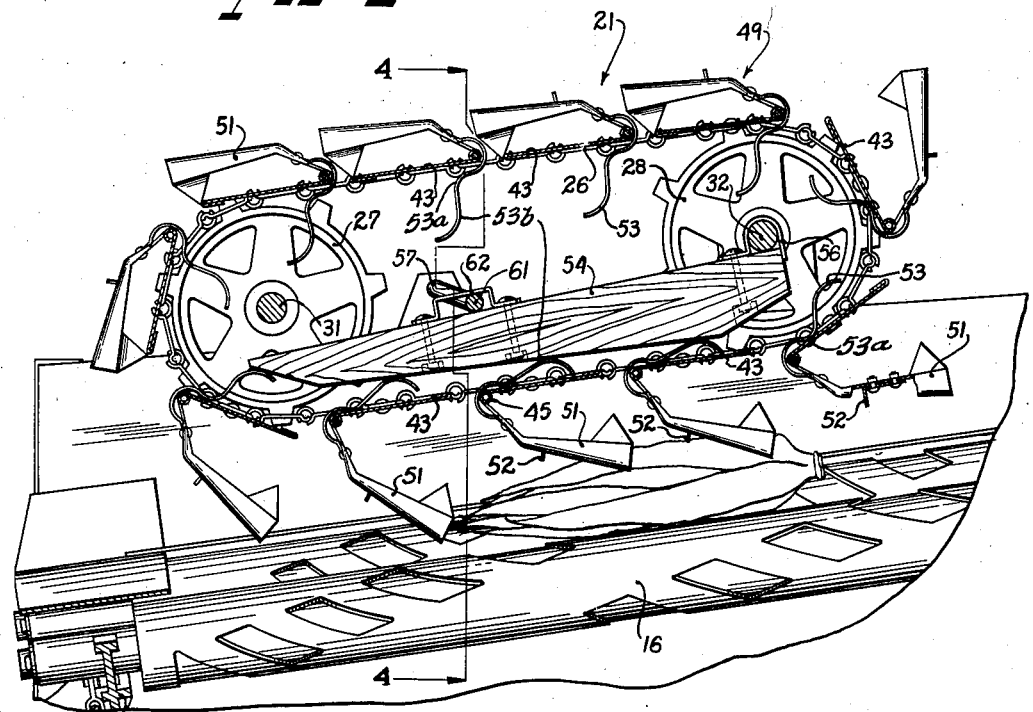
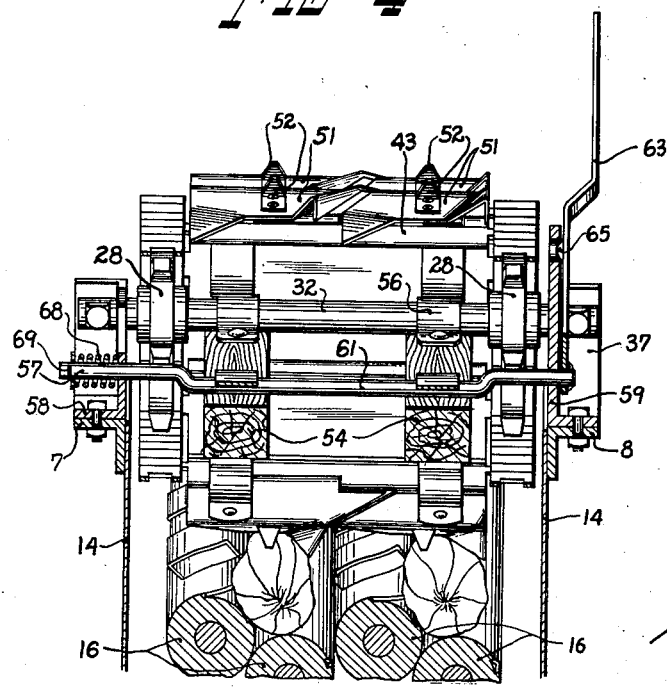
INVENTORS
RALPH L. ANDERSON
FLOYD R. MARTIN
ATTORNEYS Patented Aug. 1, 1939

2,167,967

UNITED STATES PATENT OFFICE 2,167,967

CORN HUSKER

Ralph L. Anderson, Moline, and Floyd R. Martin, East Moline, Ill., assignors to Deere & Company, Moline, Ill., a corporation of Illinois Application March 22, 1937, Serial No. 132,288

9 Claims. (Cl. 130—5)

Our invention relates generally to corn huskers and more particularly to feeding devices of the endless type which are mounted above the husking rolls of a corn husker and which are provided with presser plates positioned to engage the ears of corn as they are delivered into the husker to advance them along the husking rolls and to hold them in engagement with the rolls to facilitate removal of the husks.

The conditions under which the corn husker is operated, vary considerably due to the size of the ears of corn, the thickness of the husks on the ears, the amount of leaves and trash to be disposed of, etc. Heretofore, to adapt the usual type of feed device to these varying conditions so that it will operate satisfactorily in every instance, the weight of the presser plates has been increased or decreased to provide the particular pressure which is necessary to perform this operation. In the conventional design of feeding device, weight members are attached to the presser plates, these members being added to the plates or removed therefrom to obtain the desired pressure of the plates. This structure usually includes a large number of presser plates and to change the weight of each plate individually in this manner, involves considerable time and labor.

It is, therefore, an object of our invention to provide a means for easily and quickly adjusting the pressure of the presser plates against the ears of corn, which means is adapted to adjust all of the plates simultaneously and to provide a uniform pressure on all of the plates.

A further object of our invention is to provide a structure of this kind which is simple and economical to manufacture, positive in operation, and strong and durable in construction.

Other objects and advantages of our invention will become apparent to those skilled in the art after a consideration of the following detailed description, reference being had to the appended drawings, wherein Figure 1 is a fragmentary plan view of a corn husker upon which is mounted an endless feeding device embodying the principles of our invention;

Figure 2 is a side elevational view of the structure shown in Figure 1;

Figure 3 is a longitudinal sectional view taken on the plane of line 3—3 of Figure 1 and illustrating the details of our invention; and Figure 4 is a transverse section taken on the plane of line 4—4 of Figure 3.

The corn husker, with which we have shown our improved type of endless feeding device, is of a conventional design and for this reason only such parts thereof as are necessary to disclose the novel features of our improvement are included in the drawings. The cornhusker comprises the usual frame 6 which includes side bars 7 and 8 disposed in spaced parallel relation and supported at one end on vertical supporting bars 11 and 12, respectively, and at the opposite end on similar bars (not shown). The side bars 7 and 8 are secured to the vertical bars 11 and 12 by gusset plates 13 which are bolted or otherwise attached to the outer face of the respective bars. A side sheet 14 is provided at each side of the corn husker and these sheets are attached to the adjacent side frame members of the frame 6. A plurality of husking rolls 16 are mounted within the corn husker and are supported on transverse members 17 extending between the sides of frame 6. The husking rolls 16 are inclined downwardly to facilitate movement of the ears therelong and are arranged in pairs, one of each pair being disposed in a higher plane than its companion roll. These rolls are driven in the usual manner, the rolls of each pair rotating toward each other and serving to engage the husks and remove them from the ear.

An endless feeding device, referred to in its entirety by numeral 21, is mounted above the husking rolls 16 and serves to hold the ears of corn in engagement with the husking rolls and to move them along the husking rolls at the proper speed to ensure removal of all of the husks from the ear. The feeding device 21 includes a pair of endless chains 26 arranged in spaced parallel relation adjacent the sides of the frame 6. The chains 26 are trained over drive and idler sprockets 27 and 28, which are mounted on drive and idler shafts 31 and 32, respectively. The shafts 31 and 32 are disposed in spaced parallel relation and are arranged transversely of the frame 6. The drive shaft 31 is journaled in bearing brackets 34 secured on the side bars 7 and 8 adjacent the discharge end of the corn husker. The drive sprockets 27 are keyed or otherwise secured to the drive shaft 31 to rotate therewith. The idler shaft 32 is adjustably supported in bearing brackets 35 which are mounted on the side bars 7 and 8 adjacent the feed end of the corn husker. The bearing brackets 35 are of similar design except that one is right hand and the other left hand to be used on opposite sides of the corn husker, and comprise an angle member having a side flange 36 and a rear flange 37 which are formed integral with a base member 38. The brackets 35 are secured to the side bars 7 and 8 by bolts 39 which extend through aligned holes provided in the base member 38 and the respective side bar 7 and 8. A slot 41 is formed in the side flange 36 of each of the brackets 35 and these slots are adapted to receive the idler shaft 32. The idler shaft 32 may be adjusted forward or backward relative to the drive shaft 31 by means of adjusting bolts 42 which extend through each end of the idler shaft 31 and through holes formed in the rear flange 37 of the brackets 35. The idler sprockets 28 are journaled on the idler shaft 32 and are disposed in alignment with the drive sprockets 31.

A plurality of transverse hinge plates 43 are equidistantly spaced around the chains 26. The plates 43 are secured, at their ends, to inwardly projecting lugs 44 provided for this purpose on certain links of the chains 26. One edge of each plate 44 is rolled to form a hinge portion 45 adapted to receive a hinge bolt 46. The opposite edge of the plate 43 is bent backwardly upon itself to form a reinforcing band for the plate. The hinge portion 45 is provided, between its ends, with two notches 47 spaced apart to receive complementary hinge portions 48 formed on ear presser plates 49 which are disposed over the pairs of husking rolls 16. The hinge bolt 46 extends through the aligned hinge portions 45 and 48 of the hinge plates 43 and the presser plates 49, respectively.

The presser plates 49 are formed of sheet metal, the sides thereof being bent to form flanges adapted to hold the ears of corn in alignment with the husking rolls 16. The plates 49 are bent between their ends to provide an ear engaging portion 51. A hook 52 is secured on the outer face of the portion 51 of each of the plates 49 and is adapted to engage an ear of corn and feed it along the husking rolls 16 at the desired rate of travel. The plates 49 also serve to hold the ears of corn down upon the husking rolls, and to ensure the proper pressure on the ears, resilient fingers 53 are provided. The finger 53 is formed of flat spring material and is secured to the plate 49 adjacent the hinge portion 48 and is bent around the edge of the plate 49 and engages the under side of a presser bar or shoe 54. As shown in Figures 1 and 4 the plates 49, fingers 53 and presser bars 54 are arranged in pairs disposed transversely of the corn husker. The presser bars 54 are disposed between the upper and lower runs of the feed device 21 and are arranged in the planes of the rows of the presser plates 49 and in such a position that the fingers 53 will engage the under surface thereof as they pass along the lower run. The presser plates 49 are normally free to swing about their pivots 46 when the fingers 53 are out of engagement with the presser bar 54. To prevent the plates 49 from swinging downwardly and entangling the husking rolls 16 when the plates 49 are carried downwardly over the end of the feed device 21, the finger 53 is provided with a hump or shoulder 53a which is adapted to engage the under side of the hinge plates 43 to limit the movement of the plates 49 relative to the feed device 21. Beyond the shoulder 53a the finger 53 extends outwardly to form an arcuate contact portion 53b which engages the under surface of the presser bar 54. The presser bars 54 are pivotally supported at one end on the idler shaft 32 by means of a clip 56 bolted on the presser bars 54 and extending around the shaft 32. The opposite ends of the presser bars 54 are supported on a transverse bail 57 which is journaled adjacent its ends in bearing brackets 58 and 59 mounted on side bars 7 and 8, respectively. The portion of the bail 57 which extends over the presser bars 54 is offset at 61 and this offset portion is disposed under hammer straps 62 which are secured on the upper edge of the bars 54. The presser bars 54 may be raised or lowered to change the tension on the presser plates 49 by rotating the bail 57. To facilitate rotating the bail 57 a lever 63 is provided which is secured on one end of the bail and extends upwardly at right angles thereto. The lever 63 may be locked in any desired position to hold the bail 57 in the proper adjustment by means of a lug 65 which is fixed on the inner side of the lever 63 and selectively engages in holes 66 provided in a plate 67. The plate 67 is formed as an extension of bearing bracket 58 and extends upwardly therefrom. The holes 66 are arranged concentric with the journal portions of the bail 57 to receive the lug 65 in any position of the lever 63. When it is desired to raise or lower the presser bars 54 to change the tension on the presser plates 49, the lever 63 is moved outwardly to disengage the lug 65 from the present hole 66 whereupon the lever 63 may be stroked in either direction into a new position and the lug 65 is inserted into the adjacent one of the holes 66. The lever 63 is normally held against the plate 67 to retain the lug 65 in a selected one of the holes 66 by means of a compression spring 68 which is provided on the opposite end of the bail 57 between the bearing bracket 58 and a cotter 69 which extends through the bail 57 adjacent the end thereof. As shown in Figure 3, the presser bars 54 are adjusted to give the maximum pressure of the plates 49 against the ears of corn. In this adjustment the hump 53a is in contact with the adjacent plate 43 and the portion 53b is in contact with the presser bar 54. Any further downward movement of the presser bar 54 would not increase the pressure on the plates 49. To decrease the pressure on the plates 49 the presser bar 54 is pivoted upwardly by rotating the bail 57. When the presser bar 54 is adjusted to its higher positions and the portion 51 of the plate 49 is resting on an ear of corn, the shoulder 53a is out of contact with the plate 43. In this adjustment the tension of the spring finger 53 is exerted directly on the plate 49. Should the portion 51 pass over and out of contact with the ear, the plate 49 will swing downward until the shoulder 53a engages the plate 43 which prevents any further swinging of the plate 49 and thereby holds it from becoming entangled with the rolls 16. At this time the portion 53b is out of engagement with presser bar 54 and there is no pressure on the plate 49. To enable the bar 54 to be swung upwardly the upper edge of the bar is tapered toward its free end to provide clearance between the end of the bar and the shaft 31.

It will be apparent from the foregoing description that our structure provides an ear feeding device which is economical to manufacture, positive in operation and readily adjustable to vary the tension of the presser plates on the ears of corn. Although a preferred embodiment of the invention is as illustrated and described, it is to be understood that changes in the details of construction and arrangement of parts may be resorted to which will fall within the scope of the invention as claimed.

What we claim, therefore, and desire to secure by Letters Patent is:

1. In combination with a corn husker having a pair of spaced frame members and a plurality of husking rolls mounted between said frame members, an ear feeding mechanism disposed above said husking rolls comprising a rear transverse shaft, a front transverse shaft, said shafts being disposed in spaced parallel relation in bearing members fixed on said frame members for supporting said shafts, a sprocket mounted adjacent each end of each shaft within said frame members, the sprockets on one shaft being disposed in longitudinal alignment with those on the other shaft, an endless chain trained over each pair of aligned sprockets, a plurality of hinge pins disposed transversely between said chains and equidistantly spaced therealong, ear presser plates mounted on said hinge pins in parallel endless rows, a presser bar disposed above the lower run of each row of presser plates, said presser bars being pivotally mounted at one end on said rear transverse shaft, a transverse bail mounted on said frame engaging said presser bars at a point spaced from said one end and adapted to adjust the free end of said bars toward or away from said presser plates, and a resilient finger on each presser plate engaging the under side of said presser bar to yieldingly urge said presser plates downwardly toward said husking rolls.

2. In combination with a corn husker having a frame, and husking rolls mounted within said frame, an ear feeding mechanism comprising a rear transverse shaft, a front transverse shaft, bearing members fixed on said frame for supporting said shafts, a sprocket mounted on each shaft, said sprockets being disposed in longitudinal alignment, an endless flexible member trained over said sprockets, a plurality of ear presser plates hingedly connected to said flexible member, a presser bar pivotally mounted at one end on one of said transverse shafts, means on said frame engaging said presser bar at a point spaced from said one end to adjust the free end of said bar vertically, and resilient means between said presser bar and said presser plates to yieldingly urge said presser plates downwardly toward said husking rolls.

3. In combination with a corn husker having a frame, and husking rolls, an ear feeding mechanism including an endless member disposed over said rolls, ear presser plates pivotally mounted on said endless member, a resilient finger on each presser plate, a presser bar pivotally disposed above the lower run of said endless member and engaging said resilient fingers, and means on said frame engaging said presser bar to pivotally adjust said presser bar.

4. In combination with a corn husker having a frame, and husking rolls, an ear feeding mechanism including a plurality of presser plates continuously movable in one direction along said husking rolls, a presser bar mounted above said presser plates, and a resilient finger on each presser plate adapted to engage said presser bar to yieldingly urge said presser plates downwardly toward said husking rolls.

5. In combination with a corn husker having a plurality of husking rolls, an ear feeding mechanism including an endless member disposed over said rolls, the lower portion of said endless member moving in the direction of the material passing through the husker, a plurality of presser plates mounted on said endless member, a presser bar above said lower portion of said endless member and resilient means attached to each of said presser plates and movable in sliding engagement with said presser bar for yieldingly urging said presser plates toward said husking rolls.

6. In combination with a corn husker having a plurality of husking rolls, an ear feeding mechanism including an endless chain member disposed over said rolls, the lower portion of said endless chain member moving in the direction of the material passing through the husker, a plurality of presser plates mounted on said endless member, a presser bar adjustably mounted above said lower portion of said endless member, resilient fingers on said presser plates adapted to engage said presser bar to yieldingly urge said plates toward said husking rolls, and means for adjusting said presser bar to vary the tension on said presser plates.

7. In combination with a corn husker having a plurality of husking rolls, an ear feeding mechanism including an endless member disposed over said rolls, the lower portion of said endless member moving in the direction of the material passing through the husker, a plurality of presser plates mounted on said endless member, a presser bar disposed in a position generally longitudinally of said husking rolls, and yieldable means attached to said presser plates and slidable along said presser bar under pressure therewith to urge said presser plates toward said husking rolls.

8. In combination with a corn husker having a plurality of husking rolls, an ear feeding mechanism including an endless member disposed over said rolls, the lower portion of said endless member moving in the direction of the material passing through the husker, a plurality of presser plates mounted on said endless member, a presser bar disposed in a position generally longitudinally of said husking rolls, and springs carried on said endless member in moving engagement with said presser bar to continuously urge said presser plates toward said husking rolls.

9. In combination with a corn husker having a frame, and husking rolls, an ear feeding mechanism including an endless member disposed over said rolls, ear presser plates pivotally mounted on said endless member, a resilient finger on each presser plate, a presser bar pivotally disposed above the lower run of said endless member and engaging said resilient fingers, and means on said frame engaging said presser bar to adjust said presser bar toward or away from said husking rolls.

RALPH L. ANDERSON.
FLOYD R. MARTIN.